(12) United States Patent
Sanico (10) Patent No.: US 9,687,728 B1
(45) Date of Patent: Jun. 27, 2017

(54) SYSTEM AND METHOD OF PLAYING WORD GAMES

(71) Applicant: Alvin Sanico, Nottingham, MD (US)

(72) Inventor: Alvin Sanico, Nottingham, MD (US)

( * ) Notice: Subject to any disclaimer, the term of this patent is extended or adjusted under 35 U.S.C. 154(b) by 62 days.

(21) Appl. No.: 14/960,445

(22) Filed: Dec. 7, 2015

(51) Int. Cl.
*A63F 1/00* (2006.01)
*A63F 3/04* (2006.01)
*A63F 13/20* (2014.01)

(52) U.S. Cl.
CPC ............ *A63F 3/0423* (2013.01); *A63F 13/20* (2014.09)

(58) Field of Classification Search
CPC ...... A63F 1/02; A63F 1/04; A63F 1/10; A63F 3/0423
See application file for complete search history.

(56) References Cited

U.S. PATENT DOCUMENTS

| | | | | |
|---|---|---|---|---|
| 4,877,255 A | * | 10/1989 | von Braunhut | A63F 1/04 273/150 |
| 6,234,486 B1 | * | 5/2001 | Wallice | A63F 1/00 273/272 |
| 2005/0212215 A1 | * | 9/2005 | Loke | A63F 1/04 273/302 |
| 2014/0265128 A1 | * | 9/2014 | Kalish | A63F 1/04 273/299 |

* cited by examiner

*Primary Examiner* — James S McClellan
*Assistant Examiner* — Kevin Carter
(74) *Attorney, Agent, or Firm* — Pamela K. Riewerts, Esq.; Larry J. Guffey, Esq.; Oliver & Grimsley, LLC (57) ABSTRACT

The present invention is a system and method of playing word games wherein any letter of the alphabet can be switched to another by simple 180-degrees rotation. This unique feature fundamentally changes the usual manner by which word games are played. The resultant increase in available choices enhances user experience by providing more chances for beginners and more challenges for advanced players. In the embodiment described herein, elements of word games and solitaire are combined to provide a product that has both entertainment and educational values.

1 Claim, 8 Drawing Sheets

SYSTEM AND METHOD OF PLAYING WORD GAMES

CROSS-REFERENCE TO RELATED APPLICATIONS

This application claims the benefit of U.S. Design patent application No. 29/544,240 filed on Nov. 1, 2015, the contents of which are incorporated herein.

STATEMENT REGARDING FEDERALLY SPONSORED RESEARCH OR DEVELOPMENT

Not Applicable

REFERENCE TO SEQUENCE LISTING

Not Applicable

BACKGROUND OF THE INVENTION

The invention disclosed herein generally relates to a game. More particularly, the invention relates to a word card game.

A wide variety of games have been invented and introduced to the public over time, including those that involve forming or finding words. One challenge regarding word games is that while they can be too difficult and frustrating for children or beginners, the same can be too simple and boring for adults or advanced players. This suboptimal result is attributable, at least in part, to the inherent limitation of letter choices available to players at any given point during the game. Such word games typically have rules that disallow capitalized words but, ironically, use the majuscule or uppercase letters of the alphabet as their components.

Solitaire is a ubiquitous pastime played for centuries with actual cards as a tabletop game and, in recent decades, also with virtual cards as an electronic game. While games are expected to have entertainment value, they ideally can also have an educational impact.

BRIEF SUMMARY OF THE INVENTION

The system and method of playing word games described herein utilize specially designed characters, each of which represents not only one minuscule but also, when rotated 180-degrees, a second minuscule. Thus, only 13 characters are needed to represent all 26 minuscule or lowercase letters of the alphabet. This unique feature, whereby any letter can be instantly switched to another just by rotating the card, provides more choices for players. This invention enhances user experience by optimizing the chances for beginners and the challenges for advanced players.

In the embodiment described herein, elements of word games and solitaire are combined to provide a product that has both entertainment and educational values. The games can be played with actual or virtual cards in tabletop or electronic formats, respectively. The objective is to use up all the provided cards to form words. Challenge or achievement levels are determined by the number of words formed, with the highest score being attained by forming the lowest possible number of words with all of the given cards. In the current application, the ultimate goal is to use all of the 50 cards to form 10 words.

DETAILED DESCRIPTION OF THE INVENTION

Figure 1:
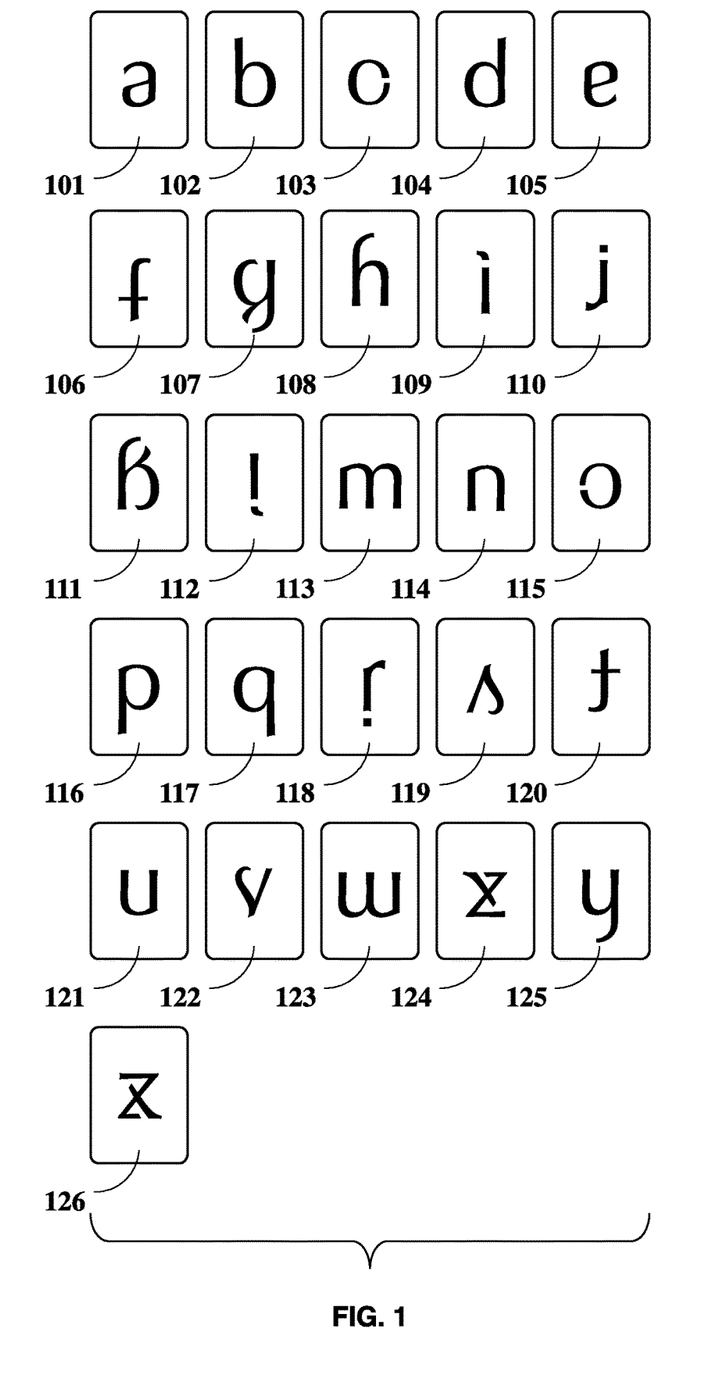
FIG. 1 shows the cards with the 13 specially designed characters that represent the complete set of 26 minuscule or lower case letters of the alphabet.

The system and method of playing word games described herein utilize 13 specially designed characters that collectively represent all the 26 minuscule or lowercase letters of the English alphabet as shown in FIG. 1.

The central unique feature of the present invention is illustrated in FIG. 1, wherein the letter "a" 101 can be instantly switched to the letter "e" 105, and vice versa, by a simple 180-degrees rotation of the card. In the same manner, the letter "b" 102 can be switched to the letter "q" 117, the letter "c" 103 can be switched to the letter "o" 115, the letter "d" 104 can be switched to the letter "p" 116, the letter "f" 106 can be switched to the letter "t" 120, the letter "g" 107 can be switched to the letter "k" 111, the letter "h" 108 can be switched to the letter "y" 125, the letter "i" 109 can be switched to the letter "l" 112, the letter "j" 110 can be switched to the letter "r" 118, the letter "m" 113 can be switched to the letter "w" 123, the letter "n" 114 can be switched to the letter "u" 121, the letter "s" 119 can be switched to the letter "v" 122, and the letter "x" 124 can be switched to the letter "z" 126.

Mathematically, the aforementioned versatility of each card provides the player more choices when attempting to find or form words by significantly magnifying the permutation involved in arranging such cards. In an ordinary word card game, for example, a hand of 5 cards, each of which represents only one letter, can maximally be arranged in 5×4×3×2×1=120 ways. In the novel system and method of playing word card games described herein, a hand of 5 cards, each of which represents either one of two letters, can maximally be arranged in 10×8×6×4×2=3,840 ways.

Figure 2:
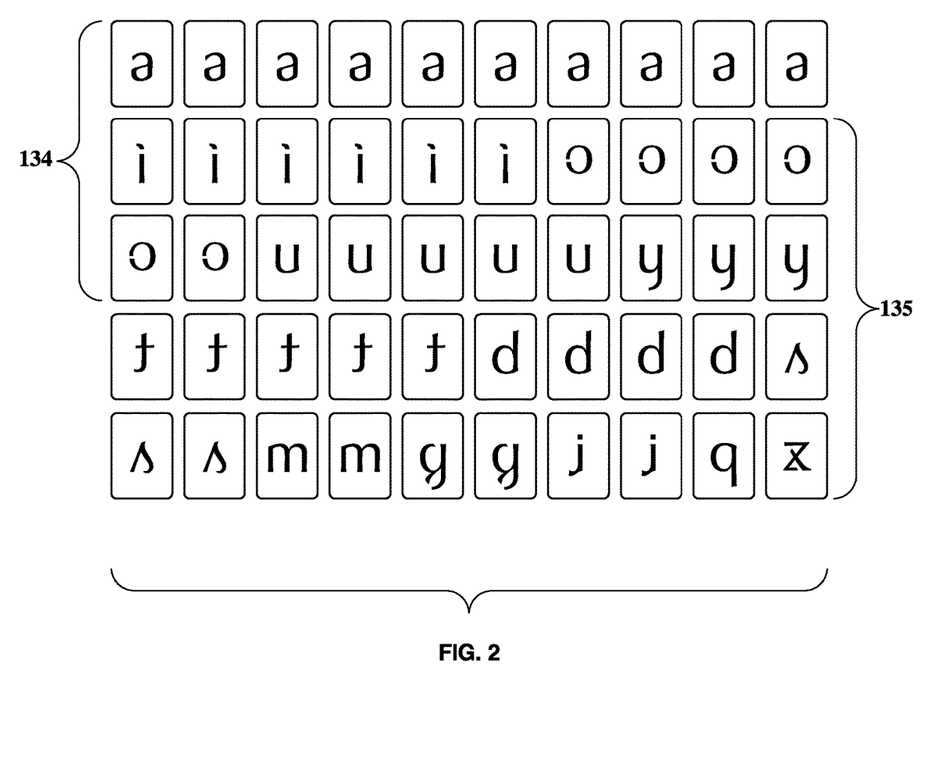
FIG. 2 shows the distribution of cards in the solitaire word game embodiment of the present invention.

The distribution of 50 cards in the solitaire word game embodiment of the present invention is based in part on the relative frequency of the letters as they appear in databases of English words and is shown in FIG. 2 as follows: "a" or "e"—10 cards, "i" or "l"—6 cards, "o" or "c"—6 cards, "u" or "n"—5 cards, "t" or "f"—5 cards, "d" or "p"—4 cards, "h" or "y"—3 cards, "s" or "v"—3 cards, "m" or "w"—2 cards, "g" or "k"—2 cards, "j" or "r"—2 cards, "q" or "b"—1 card, "z" or "x"—1 card.

Among the 50 cards in the solitaire word game embodiment of the present invention, the vowel letters "a" 101, "e" 105, "i" 109, "o" 115, "u" 121, and "y" 125 are depicted in 30 cards. The consonant letters "b" 102, "c" 103, "d" 104, "f" 106, "g" 107, "h" 108, "j" 110, "k" 111, "l" 112, "m" 113, "n" 114, "p" 116, "q" 117, "r" 118, "s" 119, "t" 120, "v" 122, "w" 123, "x" 124, "y" 125, and "z" 126 are depicted in 40 cards. Of note, the letter "y" 125 can be used in a word as either a vowel or a consonant.

It is thus highly remarkable that while 30 out of 50 (60%) cards in the present invention can be used as vowels 134, 40 out of 50 (80%) of the same set of cards can be used as consonants 135. This distinctive effect on the probability of any card being available as a vowel and/or a consonant, in addition to the previously mentioned enhanced permutation involved in arranging cards, fundamentally changes the usual manner by which word games are played.

Figure 3:
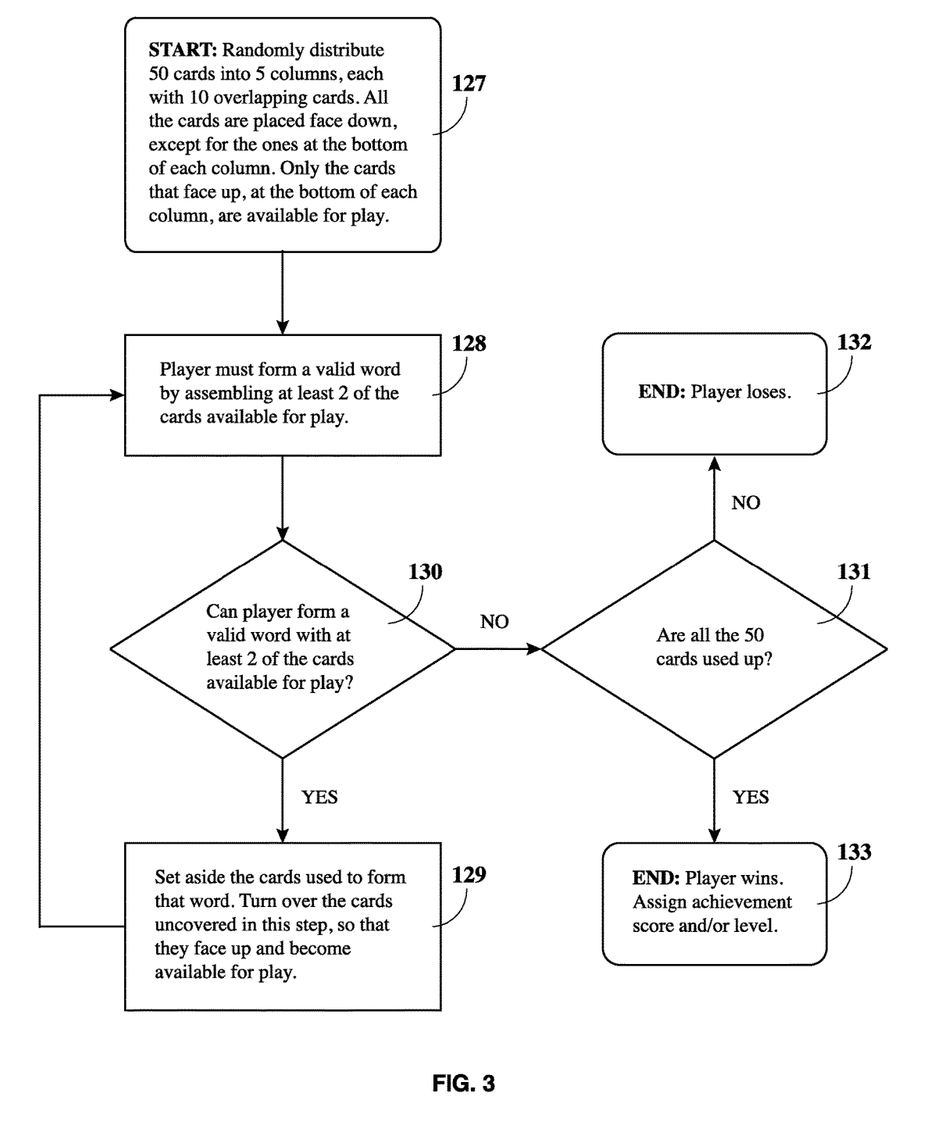
FIG. 3 shows the algorithm applied in the solitaire word game embodiment of the present invention.
Figure 4:
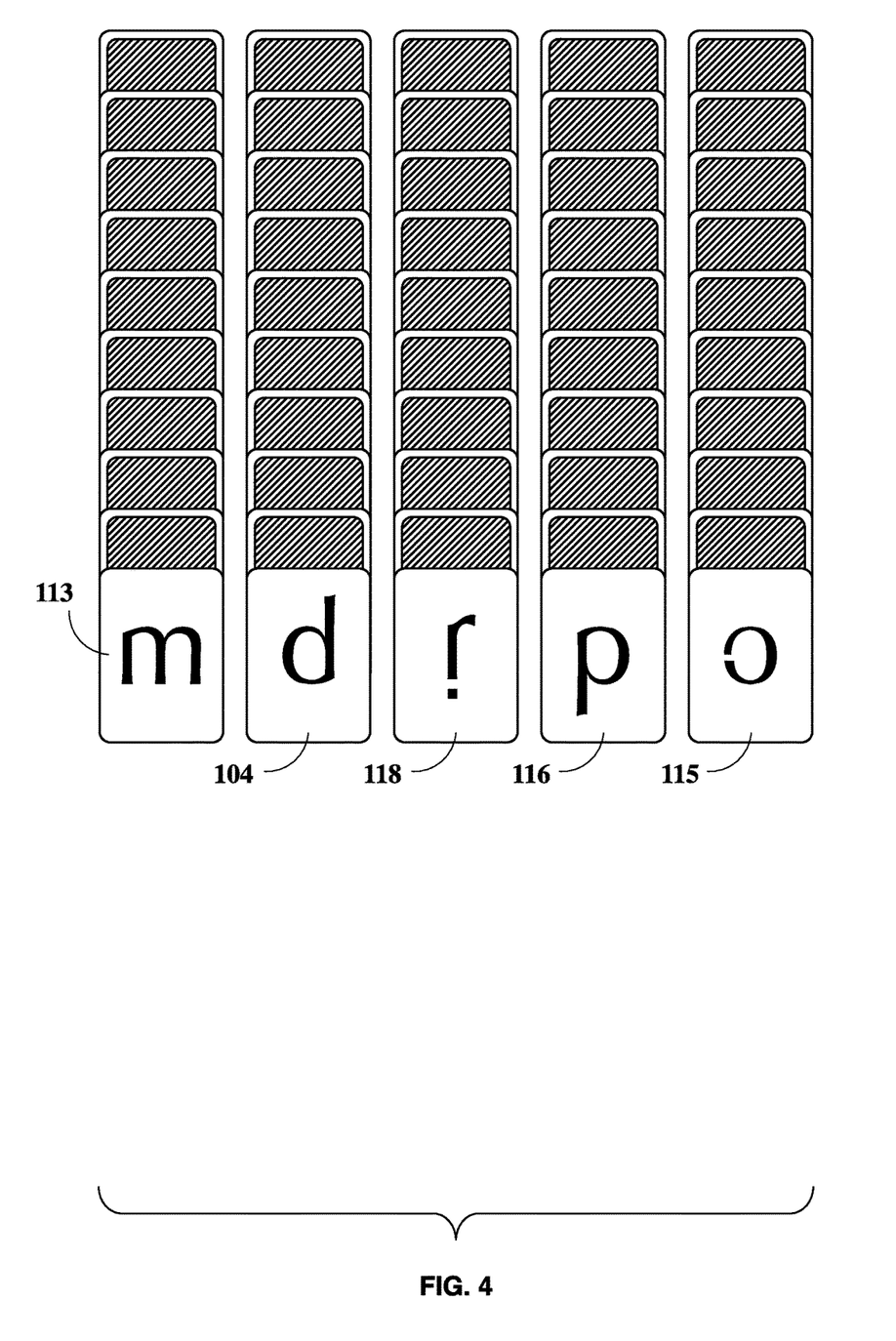
FIG. 4 shows a typical initial setup of cards in the solitaire word game embodiment of the present invention.

FIG. 3 shows the algorithm applied to the solitaire word game embodiment of the present invention. To start a new game 127, the 50 cards shown in FIG. 2 are randomly distributed into an array of 5 columns, each of which is comprised of 10 overlapping cards as shown in FIG. 4. As illustrated in this typical initial setup, all the cards are placed face down, except for the ones at the bottom of each column. Only the cards that face up, at the bottom of each column, are available for play.

The player must form a valid word using at least two of the cards available for play 128. To accomplish this step, one or more letters may have to be switched to another. The player can make such a switch by manually rotating the actual card in the tabletop version, or by tapping or clicking the virtual card in the electronic version of the games. the electronic version of the word game including, an input device, an output device, a storage device, and a processor.

Figure 5:
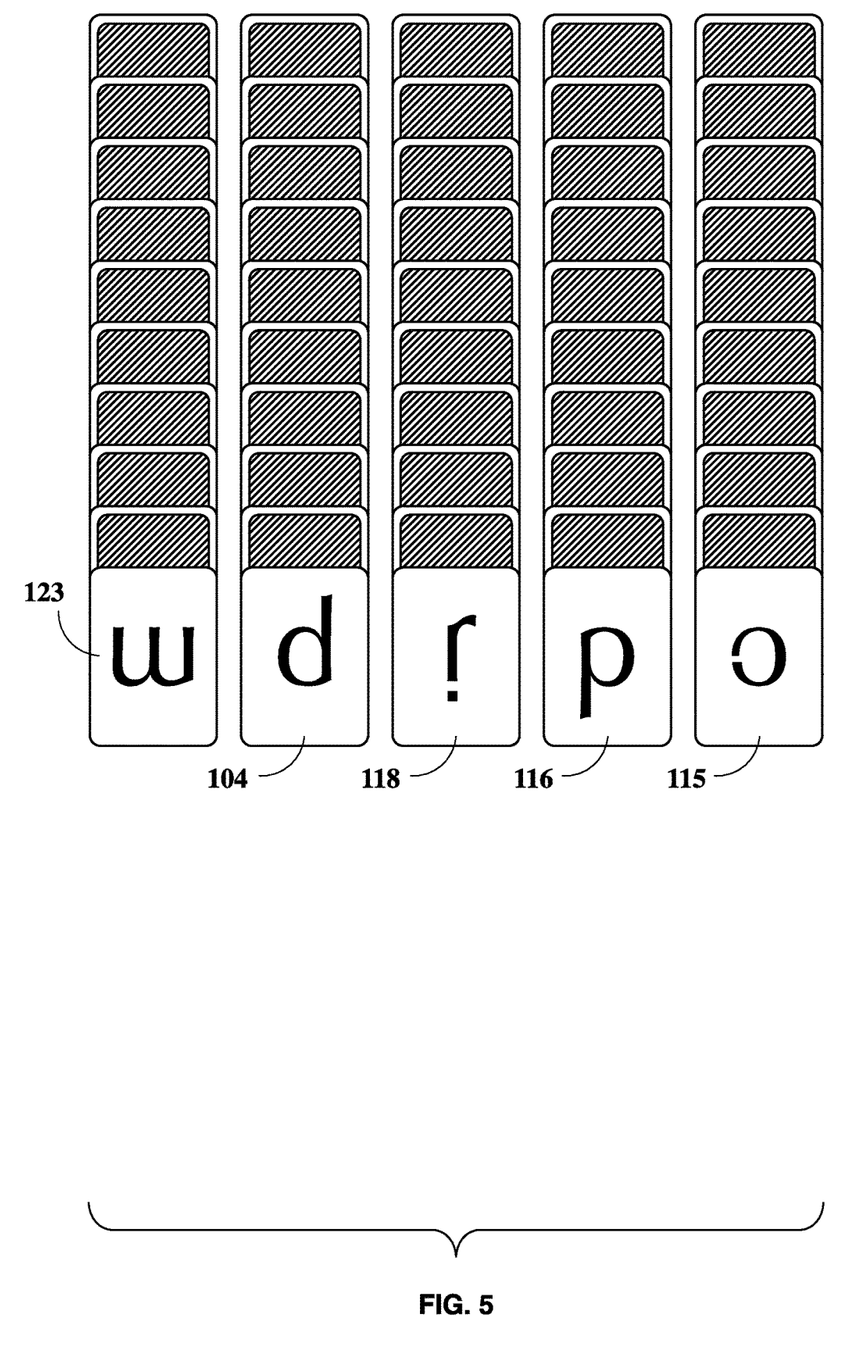
FIG. 5 shows a typical play on a card in the initial setup of the solitaire word game embodiment shown in FIG. 4.
Figure 6:
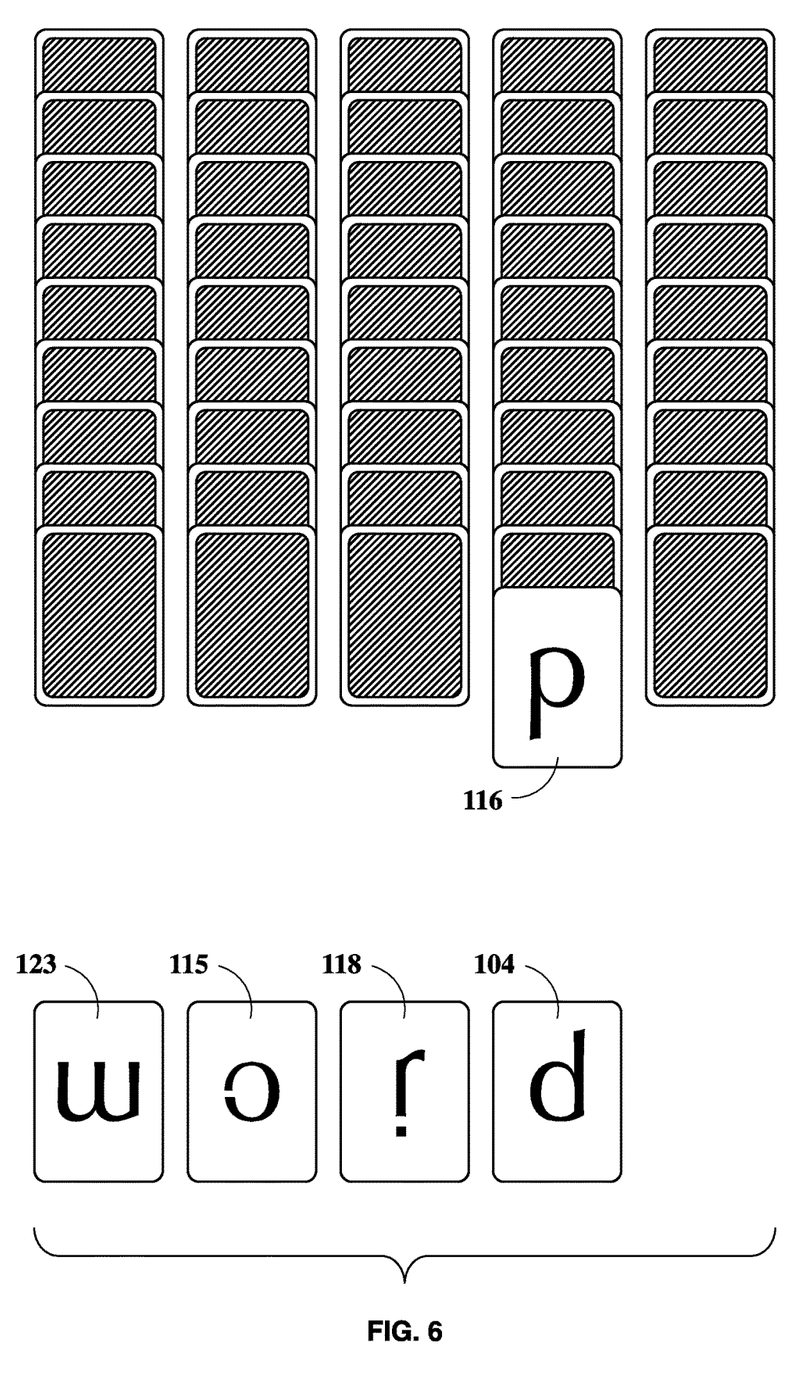
FIG. 6 shows a typical subsequent play on the cards in the solitaire word game embodiment shown in FIG. 5.

A word can be formed by manually assembling the actual cards in the tabletop version or by dragging and dropping the virtual cards into designated slots in the electronic version of the games. As an example, the letters "w" 123, "d" 104, "r" 118, and "o" 115 in FIG. 5 can be rearranged and assembled in the proper sequence to form "w-o-r-d" as shown in FIG. 6.

The word is determined to be valid if it is comprised of two or more letters, if it is listed in a dictionary or similar reference that exists in either printed or electronic form, and if it is not disqualified due to restrictions as follows. Abbreviations and words that require an apostrophe, hyphen or capitalization are not allowed 128.

Figure 7:
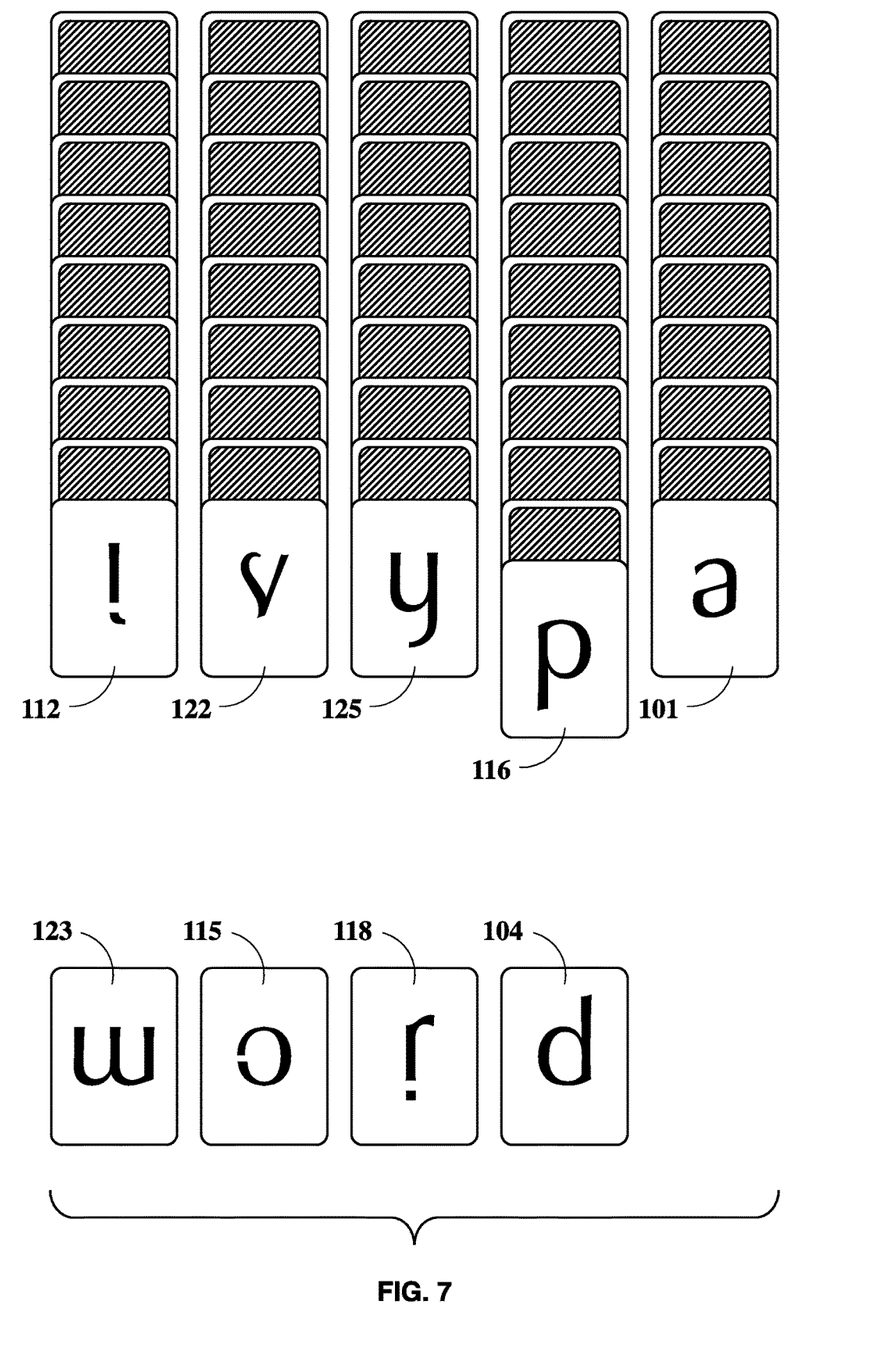
FIG. 7 shows a typical subsequent setup of cards in the solitaire word game embodiment following the play shown in FIG. 6.

All the cards used to form a valid word are removed from the array and set aside. The cards that are consequently uncovered by this step are then turned over to make them face up and, therefore, available for play 129 as shown in FIG. 7.

Figure 8:
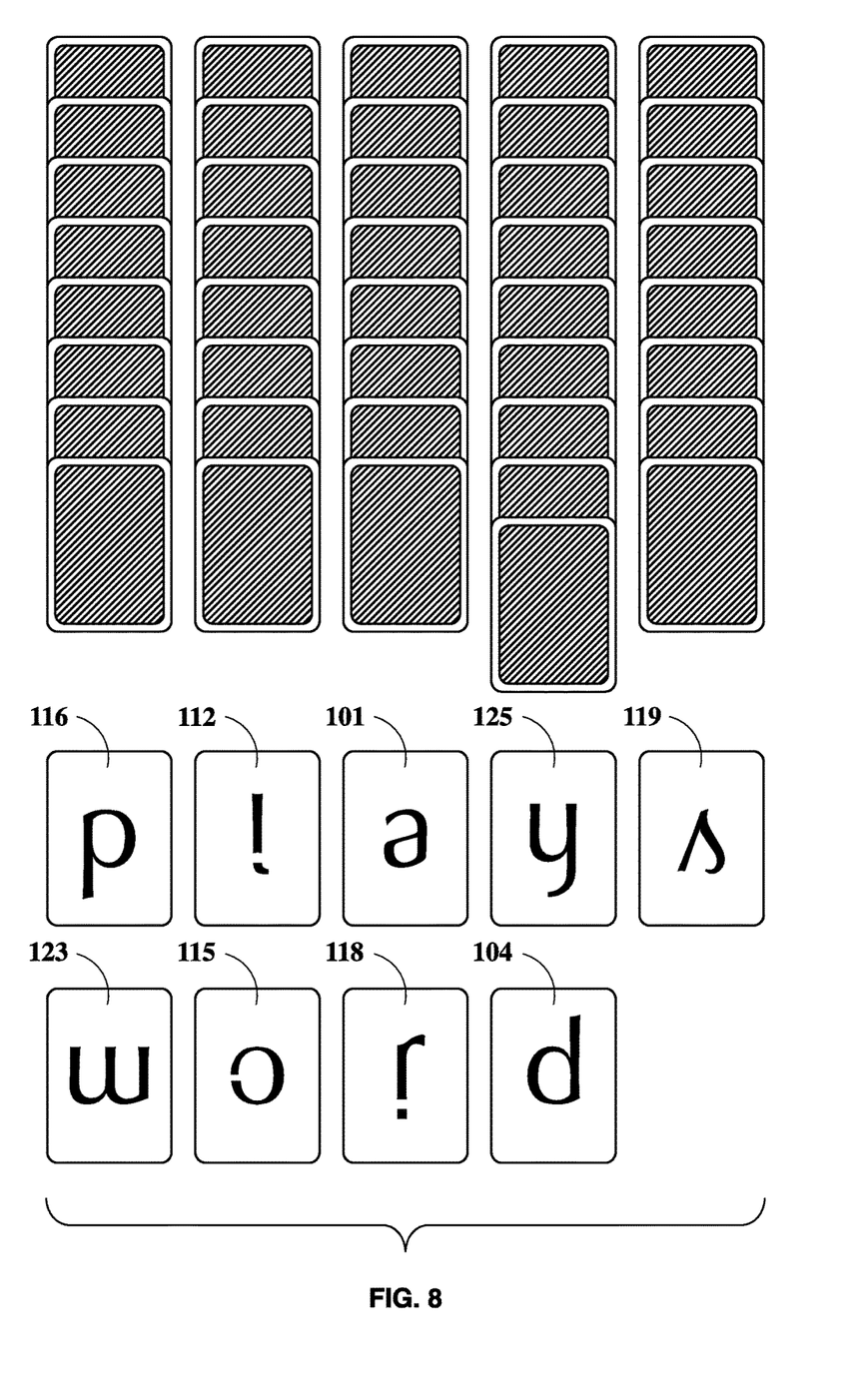
FIG. 8 shows a typical subsequent play on the cards in the solitaire word game embodiment shown in FIG. 7.

The player must form a valid word again using at least two of the cards available for play as shown in FIG. 8. In this example, the card with the letter "v" 122 in FIG. 7 is rotated to switch it to the letter "s" 119 in FIG. 8. The letters "l" 112, "s" 119, "y" 125, "p" 116, and "a" 101 are then rearranged and assembled in the proper sequence to form "p-l-a-y-s" as shown in FIG. 8.

The cycle as described and as illustrated in FIG. 3 continues until the player can no longer form a valid word, in which case the game ends 130.

If all the 50 cards are used up in forming words at the end of the game 131, the player wins 133. Otherwise, the player loses 132.

When the player wins, the challenge or achievement level 133 is determined based on its inverse relationship with the number of words formed. In the solitaire word game embodiment described herein, the ultimate goal is to use all the 50 cards to form 10 words.

In the tabletop version of the game, the player counts the total number of words formed with 50 cards to determine the attained challenge or achievement level. An example range of levels based on the total number of words formed with 50 cards are as follows: 10 words—Extreme Level, 11 to 12 words—Epic Level, 13 to 14 words—Elite Level, 15 or more words—Easy Level.

In the electronic version of the game, a scoring system can be employed such that longer words are assigned higher point values. An example range of point values based on the length of formed words are as follows: 5 letter word—25 points, 4 letter word—16 points, 3 letter word—9 points, 2 letter word—4 points. The final score is calculated as the sum of the point values of the words formed with 50 cards. Thus, the perfect or highest attainable score in such a scoring system is 250 points.

An alternative scoring system for more advanced players entails the assignment of a numerical point value for each letter, based in part on the relative frequency of their appearance in databases of English words, as in the following example: "a"—1 point, "b"—5 points, "c"—3 points, "d"—2 points, "e"—1 point, "f"—3 points, "g"—4 points, "h"—2 points, "i"—1 point, "j"—8 points, "k"—5 points, "l"—2 points, "m"—3 points, "n"—1 point, "o"—1 point, "p"—3 points, "q"—10 points, "r"—2 points, "s"—1 point, "t"—1 point, "u"—3 points, "v"—5 points, "w"—4 points, "x"—8 points, "y"—4 points, and "z"—10 points. Thus, "w-o-r-d" in FIGS. 6, 7, 8 is worth 9 points and "p-l-a-y-s" in FIG. 8 is worth 11 points. The final score is calculated as the sum of the point values of all the letters used in forming words with 50 cards.

Comparative analysis of the present vis-à-vis the past achievement scores of the same player and/or other players can enhance the heuristic experience and promote the educational and entertainment values of the solitaire word game embodiment of the present invention.

What is claimed is:

1. A game system for playing an electronic word game comprising:
    an input device for receiving user inputs;
    an output device for presenting game system outputs;
    a storage device for storing game system data, including:
        a set of virtual cards comprising thirteen virtual cards, wherein each of the thirteen virtual cards displays a single combination character which represents two letters of the English alphabet, the first letter of the single combination character is recognizable in a first orientation, and a second letter of the single combination character is recognizable in a second orientation that is rotated 180-degrees relative to the first orientation, the first letter and the second letter are represented by thirteen pairs of letters used to form the single combination characters, each of the thirteen pairs of letters are pairs consisting of: "a" and "e", "b" and "q", "c" and "o", "d" and "p", "f" and "t", "g" and "k", "h" and "y" "i" and "l", "j" and "r", "m" and "w", "n" and "u", "s" and "v", and "x" and "z";
        a first designated numerical point value assigned to each of the letters of the English alphabet used to form the word; and
        a second designated numerical point value according to the number of letters used to form the word;
    a processor configured to:
        randomly distribute and output a plurality of virtual cards, wherein the plurality of virtual cards includes face-up virtual cards and face-down virtual cards;
        process the user inputs, wherein the user rotates one or more of the face-up virtual cards from the first orientation to the second orientation to form the word;

calculate a total point value of the word based on the first designated numerical point value or the second designated numerical point value to determine an achievement score or an achievement level of the user; and present the user with an outcome of the electronic word game via the output device.

\* \* \* \* \*